June 5, 1934.  H. L. COBB ET AL  1,962,002

SPRING COMPRESSOR

Filed Oct. 11, 1933

Inventor
Herbert L. Cobb
Maurice L. Cobb

By Townsend F. Beaman

Attorney

UNITED STATES PATENT OFFICE 1,962,002

SPRING COMPRESSOR

Herbert L. Cobb and Maurice L. Cobb, Brooklyn, Mich.

Application October 11, 1933, Serial No. 693,166

6 Claims. (Cl. 29—87.1)

This invention relates to improvements in spring compressors having particular reference to a device for conveniently maintaining a compressed spring in such a state or compressing a previously uncompressed spring to facilitate the insertion or removal of the same from the chassis or frame of a motor vehicle.

In the assembly and repair of the present day motor vehicle it is necessary in both the longitudinal and transverse types of leaf springs to flex the same in one direction to straighten or lengthen the spring in order to locate its ends in the mounting brackets or shackles or to conveniently remove the same therefrom.

Thus it becomes the object of the present invention to provide a spring compressor which may be effectively employed in the insertion and removal of vehicle springs yet at the same time is sturdy, easily applied, and of inexpensive construction.

Other objects and advantages reside in the novel arrangement and combination and construction of parts as will appear and be further discussed in detail in the following description. The invention is clearly defined in the appended claims.

In the drawing, wherein one practical form of the invention is disclosed by way of illustration, Fig. 1 is an end elevation of a vehicle equipped with transverse springs showing my improved compressor in position.

Figure 1:
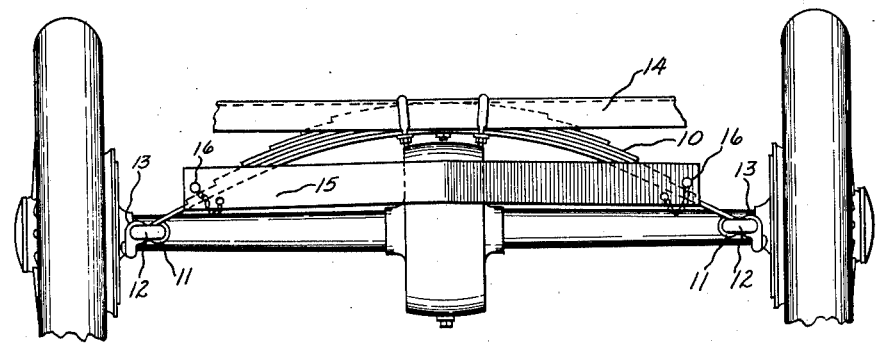

Generally, my invention consists in a rigid member for the transverse and longitudinal guiding of the ends of the springs to be compressed to facilitate insertion or removal from the usual mounting bracket or shackles. Preferably, this rigid member takes the form of a channel fabricated in any suitable manner and conforming to the width and vertical projection of the spring. With the ends of the spring guided by the channel, the spring is compressed partially into the channel through the application of force preferably along the minor axis in the case of a semi-elliptical spring. As illustrated, one simple and effective way to apply such force is through the employment of a U-bolt which embraces both the central portion of the spring and channel. When the U-bolt is drawn up the spring will be flexed and lengthened being guided transversely and longitudinally by the channel.

In order that the invention may be fully understood specific reference is now made to the accompanying drawing where the rear end of the chassis of a motor vehicle is shown provided with a transverse semi-elliptical leaf spring 10 of well known construction. The main leaf of the spring, as is usual, terminates in sleeve portions 11 which receive the shackle bolts of the shackles 12 to support the spring from perches 13 attached to the chassis. The body 14 of the vehicle is supported upon the spring 10 and removably secured thereto in some suitable manner.

Figure 2:
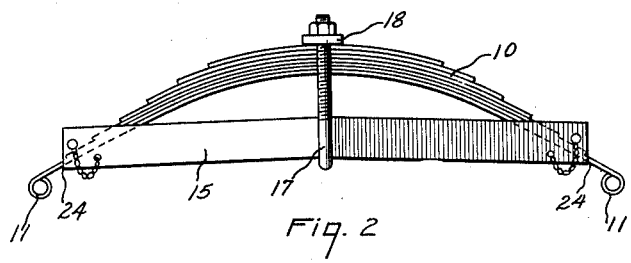
Fig. 2 is a side elevation of a spring retained in an extended or compressed state through the employment of the present invention.
Figure 3:
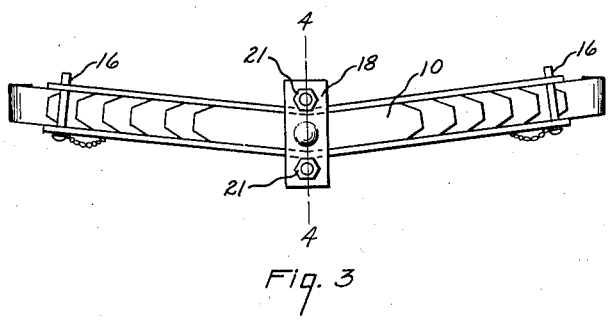
Fig. 3 is a plan view of Fig. 2.
Figure 4:
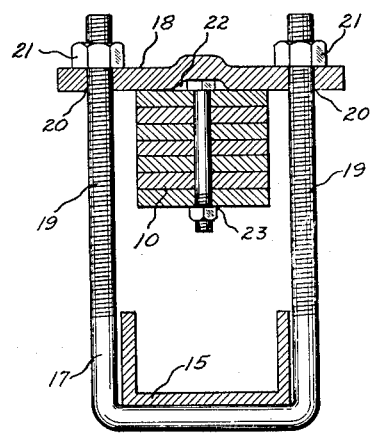
Fig. 4 is a cross-sectional view taken on line 4—4 of Fig. 3.
Figure 5:
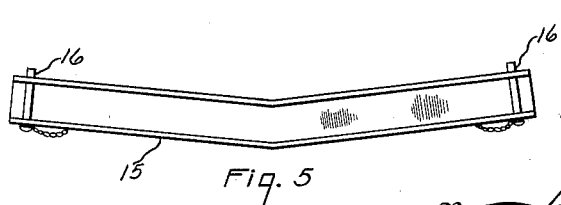
Fig. 5 is a plan view of the guiding channel member.

Although the present invention is in no sense limited to springs of a particular configuration, for the purpose of illustration and as exemplary of one specific application the rigid channel 15 is shown as having a configuration corresponding to the vertical projection of the spring used in the latest Ford motor vehicle in which the sections of the springs are slightly angularly disposed to avoid interfering with the differential housing. When it becomes necessary to remove the spring 10 from the chassis for any reason, the channel 15 is positioned as shown in Fig. 1 and may be conveniently suspended from the ends of the spring 10 by means of removable pins 16 which confine the springs between themselves and the web of the channel 15. The body 14 is then detached from the spring 10 and raised removing the weight of the same therefrom and making it possible to embrace the central portions of the spring 10 and channel 15 by the U-bolt 17 and draw bar 18 as best shown in Figs. 2 and 4. The parallel arms of the U-bolt are threaded as at 19 and extended through apertures 20 in the draw bar. Suitable nuts are threaded upon the parallel arms of the bolt and function to draw the bar 18 downwardly. Preferably, the bar 18 is provided with a depression 22 to accommodate the head of the bolt 23 which is usually employed to bundle the leaves of the spring together. This construction also helps to prevent the shifting of the U-bolt along the spring. It is also to be noted from Fig. 2 that channel 15 is slightly inclined centrally to assist in the central locating of the U-bolt.

Obviously, it is substantially optional whether the draw bar engages the spring or the underside of the web of the channel with the U-bolt inserted from the position shown in Fig. 4. Furthermore, drawing up mechanisms other than the U-bolt and bar shown should readily suggest themselves to those skilled in the art and it is not our intention to be limited to the exact structure shown.

When the weight of the body is removed from the spring it has a tendency to shorten and for this reason it is necessary to draw the bar 18 to compress and lengthen the spring sufficiently to permit the shackle bolts to be readily removed from the sleeves 11. The spring 10 and the element constituting the compressor may now be conveniently removed from the chassis as a unit; the U-bolt and draw bar compressing the spring by urging the ends, which are transversely and longitudinally guided and steadied by the channel, into engagement with the ends of the channel as at 24. As the spring is retained in the same state by the compressor as it occupied at the time of removal, it may be readily reinstated as the sleeves 11 will be in alignment with the shackles. As will be fully appreciated, the compressor is as well adapted for the installation of new springs upon the chassis as for the removal and reinstatement of the old. With the spring located and guided by the rigid channel member, through manipulation of the nuts 21 the spring may be flexed to give any desired length of span between the points of mounting or fixation.

Having described our invention what we claim as new and desire to protect by Letters Patent is:

1. A spring compressor comprising a rigid channel member in which the ends of a bowed spring element are adapted to be transversely and longitudinally guided, a U-bolt, a draw bar having spaced apertures for the insertion of the same over said U-bolt, said U-bolt and bar embracing the central portion of said channel and spring, and nuts threaded upon said U-bolt and adapted to be drawn down against said draw bar to compress and clamp said spring in said channel whereby the overall length of the spring may be regulated.

2. A compressor for vehicle springs comprising a rigid channel member in which the portions of a bowed spring element adjacent the ends are adapted to be transversely and longitudinally guided and supported, said member being of less length than the overall length of said spring when located upon the vehicle, a U-bolt, a draw bar having spaced apertures for the insertion of the same over said U-bolt, said U-bolt and bar embracing the central portion of said channel and spring, and nuts threaded upon said U-bolt and adapted to be drawn down against said draw bar to compress and clamp said spring in said channel whereby the overall length of the spring may be regulated.

3. A compressor for vehicle springs comprising a rigid channel member in which the portions of a bowed spring element adjacent the ends are adapted to be transversely and longitudinally guided and supported, said member being of less length than the overall length of said spring when located upon the vehicle, compressing and clamping means embracing the central portion of said member and spring to compress and clamp said spring in said channel whereby the overall length of the spring may be regulated.

4. A compressor for vehicle springs comprising a rigid member in which the portions of a bowed spring element adjacent the ends are adapted to be transversely and longitudinally guided and supported, said member being of less length than the overall length of said spring when located upon the vehicle, compressing and clamping means embracing the central portion of said member and spring to compress and clamp said spring to said member whereby the overall length of the spring may be regulated.

5. A compressor for vehicle springs comprising a portable rigid member along which the portions of a bowed spring element adjacent the ends are adapted to be longitudinally guided and supported, means operatively connected to said member and engaging the central portion of said spring, said means including manually operable means for compressing and clamping said spring to said member to regulate the overall length of the spring.

6. A compressor for vehicle springs comprising a rigid member for longitudinally guiding and supporting the end portions of a bowed spring element during compression to regulate its overall length, means operatively connected with said member and engageable with the central portion of said spring to draw the same inwardly toward said member to effect movement of said ends longitudinally of said member in opposite directions, said spring, member and means being portable as a unit.

HERBERT L. COBB.
MAURICE L. COBB.